United States Patent [19]

Bell

[11] 3,874,164

[45] Apr. 1, 1975

[54] DAY-DATE-TIME DIAL

[76] Inventor: Eugene Bell, Rt. No. 1, Box 144, New Braunfels, Tex. 78130

[22] Filed: Oct. 9, 1973

[21] Appl. No.: 404,252

[52] U.S. Cl. .............................. 58/152 T, 58/145 K
[51] Int. Cl. ....................... G04b 37/12, G04b 37/20
[58] Field of Search .......... 58/145 R, 145 K, 152 R, 58/152 T; 179/179

[56] References Cited

UNITED STATES PATENTS

| | | | |
|---|---|---|---|
| 3,089,303 | 5/1963 | Dahl | 58/145 K |
| 3,596,463 | 8/1971 | Rudolph | 58/152 R |
| 3,628,322 | 12/1971 | McDuffee | 58/4 |

FOREIGN PATENTS OR APPLICATIONS

| | | | |
|---|---|---|---|
| 331,704 | 9/1958 | Switzerland | 58/152 T |

*Primary Examiner*—Edith Simmons Jackmon
*Attorney, Agent, or Firm*—John R. Powell; Eugene Bell

[57] ABSTRACT

A time-piece for use in conjunction with telephone calls so that a person can conveniently observe the time while making a long distance telephone call so that he gets a full benefit of a time limit without going overtime so that the telephone call does not become expensive, the device consisting of a clock mounted centrally upon a pivotable dial of a telephone receiver set, the clock having a dial face graduated in minutes, and the mechanism including an hour hand and a minute hand that sweeps across the dial face.

3 Claims, 6 Drawing Figures

DAY-DATE-TIME DIAL

This invention relates generally to telephone accessories. More specifically the present invention relates to time pieces.

Practically all persons are aware that long distance telephone calls are expensive when compared to telephone calls that are local. It is also well known that when a person makes a long distance telephone call, he can very easily become absorbed in the conversation so that he disregards the length of time that he is talking on the telephone so that the call takes up a considerable time. Long distance telephone calls are billed according to the length of time consumed so that when such person finally receives his bill from a telephone company, he may be surprised that the long distance call was of a longer duration than he had anticipated so that it is rather expensive. This is an objectionable situation and persons are therefore becoming more and more concerned in keeping long distance telephone calls at a minimum length of time. A clock may not be always handy near a telephone and even if there be one, it may be difficult to keep track of time upon the clock that indicates the length of time of the call. This situation is of course objectionable and therefore in want of an improvement.

It is therefore a principal object of the present invention to provide a device that is mountable upon a telephone receiver set and which is designed particularly for aiding a person in timing a long distance telephone call.

Another object of the present invention is to provide a device that consists of a time piece cnveniently located upon a dial of a telephone receiver set so that it is directly in front of a person while speaking on a telephone and where it can be easily seen.

Still another object of the present invention is to provide a day-date-time dial which is in one form of the invention designed so that it can be pre-set to limit a length of a long distance telephone conversation.

Other objects are to provide a day-date-time dial which is simple in design, inexpensive to manufacture, rugged in construction, easy to use and efficient in operation.

These and other objects will be readily evident upon a study of the following specification together with the accompanying drawing wherein.

Figures 1, 2:
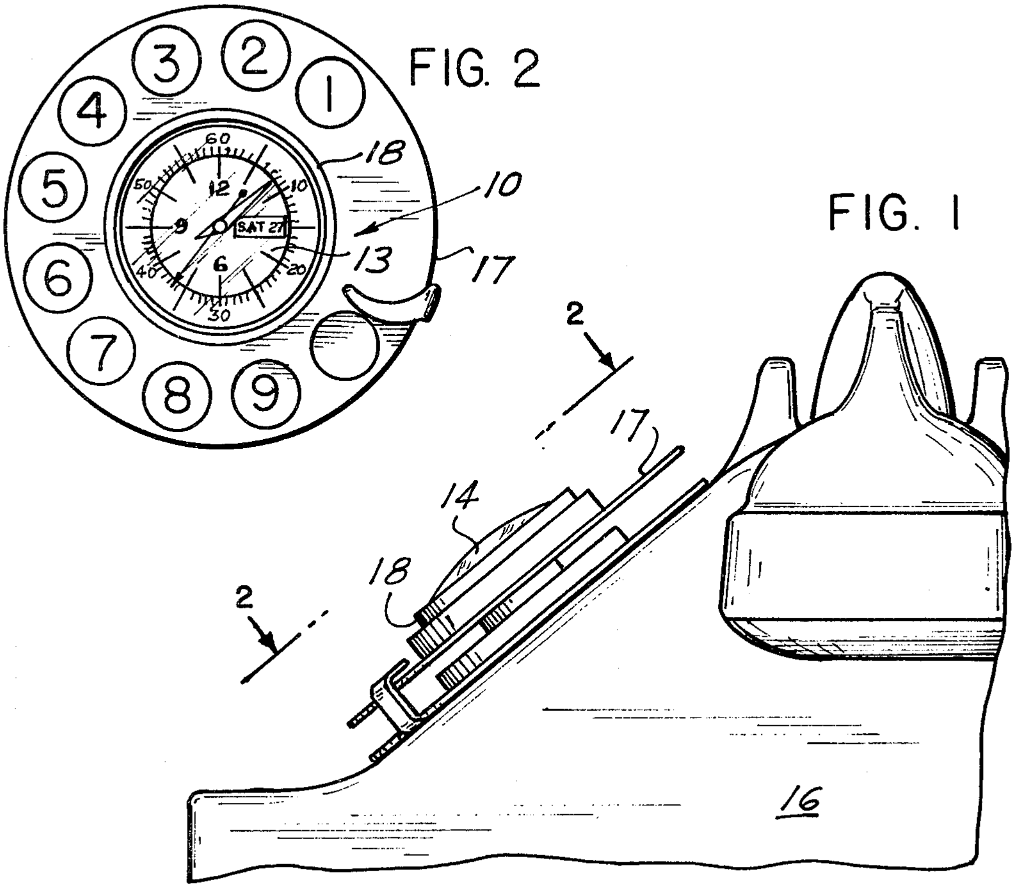
FIG. 1 is a side elevation view of a telephone receiver set and shown with the present invention mounted upon the dial thereof.
FIG. 2 is a top plan view of the present invention as viewed on line 2—2 of FIG. 1.
Figure 3:
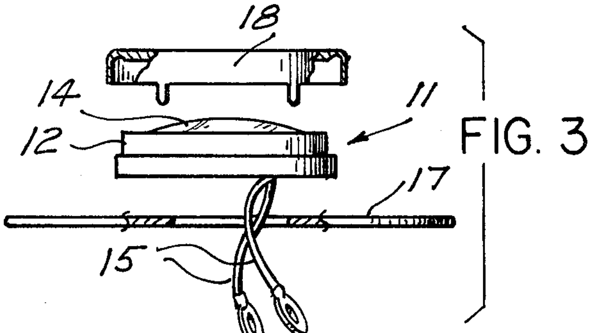
FIG. 3 is a side elevation view of a bezel watch and dial in relative position to each other for assembly together.

Reference is now made to the drawings in detail, and more particularly at this time to FIGS. 1 through 3 thereof, wherein the reference numeral 10 represents a day-date-time dial, according to the present invention, that essentially constitutes a time-piece such as a watch, such watch shown at 11 includes a case 12, containing a time piece mechanism, not shown, a dial 13 under a transparent cover glass 14, and a conventional hour, minute and second hands that sweep around in front of the dial face so that a person can read a time.

Additionally, as shown in FIG. 2, such watch 11 may include a calendar mechanism for indicating the day of a week and a date of a month. The movement of such calendar mechanism and the movement of the hands are derived from the time piece mechanism, which in the present invention can be powered either by a small battery or which can be electrically operated by means of wires 15 connected to the electrical wiring within the telephone receiver set 16. The watch 11 is placed upon a telephone dial 17 and is retained thereupon by means of a bezel 18 that is snapped upon the dial.

Accordingly, in use, such time piece is conveniently located so that a person can see the time while telephoning. such telephone receiver set is usually placed nearby in front of a person so that he can readily look down and see the passing of time upon the watch. Thus the person can recognize when a 3-minute long distance conversation should be ended so that he is not obliged to run up a high telephone bill. An advantage of the present invention is that a person can continue a telephone conversation for a full 3 minutes and not get off ahead of time in case he is obliged to pay for the entire minimum time.

Thus there is provided a day-date-time dial that serves a useful purpose.

Figure 4:
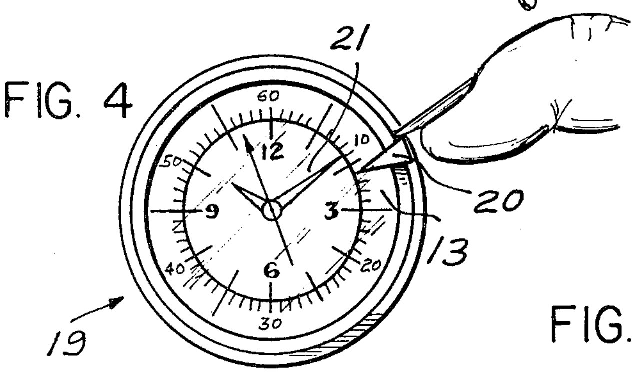
FIG. 4 is a top view of a modified design of the invention in which an indicator arrow can be manually rotated to a position ahead for reminding a person when a time limit for a long distance telephone call should be terminated so that it is within a perscribed number of minutes.
Figure 5:
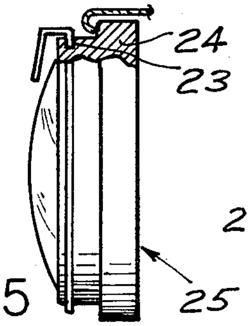
FIG. 5 is a side view thereof, shown partly in crosssection.
Figure 6:
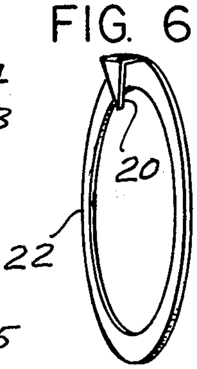
FIG. 6 is a perspective view of an indicator arrow element that is utilized in the structures illustrated in FIGS. 4 and 5.

Reference is now made to FIGS. 4 through 6 wherein a modified design of day-date-time dial 19 incorporates all of the above described features and which additionally includes an indicator arrow 20 that can be manually pushed so that it can be set for a particular minute upon the dial face 13 in order that it automatically reminds an observer of a time limit when a minute hand 21 reaches the same. Thus in this form of the invention it is easier for a person to concentrate on his conversation without making mental calculations with a particular time being due. Thus a person is visually notified when a time limit is up.

The indicator arrow 20 is formed integrally on a ring 22 that is fitted rotatably within an annular groove 23 around the case 24 of the time piece 25. To reset the indicator arrow, a person merely pushes the arrow forwardly or rearwardly, as shown in FIG. 4 to a point where it is aimed directly at a specific minute of time at which a telephone conversation is intended to be concluded, and which will occur when the minute hand moves by the clock mechanism so that it aligns with the indicator arrow. Thus a person can gain a full use of the time for conversation without going overtime.

Thus a modified design of the invention has been provided.

What I now claim is:

1. In a day date time dial, the combination of a telephone receiver set that includes a rotatable dial for dialing telephone numbers, a center of said dial having a time piece mounted there upon, said time piece including a case enclosing a clock mechanism, a dial being located upon a front side of said case and enclosed by a transparent glass cover, said dial being graduated into minutes, a conventional hour, minute and second hand sweeping around a front of said dial face, said hands being operated by said clock mechanism, and a means being included around said time piece so to notify a person when a pre-determined time for telephone conversation is running out, said means including a singular arrow head and positioned directly over a front side of said clock case.

2. The combination as set forth in claim 1 including an electrical wiring in said telephone receiver set, wherein an electrical connection is made between said clock mechanism and the telephone receiver set electrical wiring so that said clock mechanism moves to indicate a day of a week, and a date of a month.

3. The combination as set forth in claim 2, wherein said means comprises a ring rotatable around said case and fixedly carrying said arrow head so that said arrow head can be pre-set to point at any particular calibration on said dial face.

* * * * *